(No Model.) 2 Sheets—Sheet 1.

E. N. GILFILLAN.
SPRING SCALES.

No. 431,205. Patented July 1, 1890.

Witnesses.

Inventor
E. N. Gilfillan
By Jno. G. Elliott.
Atty.

(No Model.) 2 Sheets—Sheet 2.
E. N. GILFILLAN.
SPRING SCALES.
No. 431,205. Patented July 1, 1890.
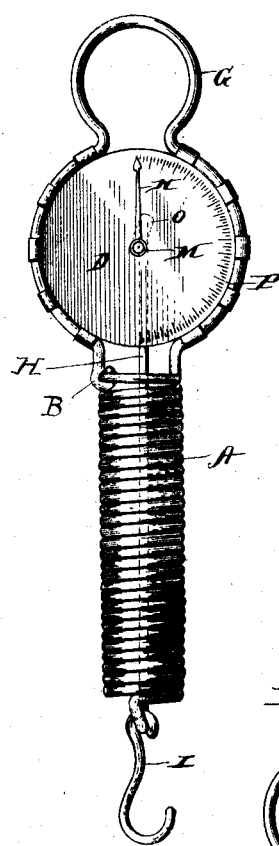
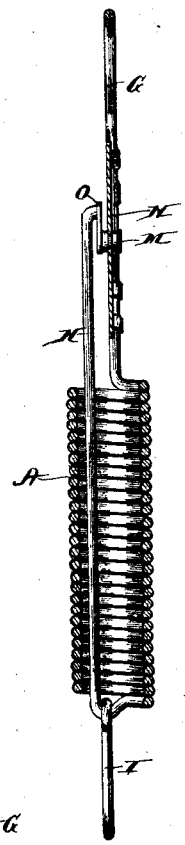
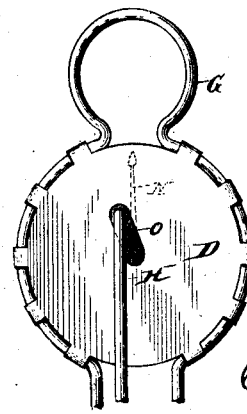

UNITED STATES PATENT OFFICE.

ESSINGTON N. GILFILLAN, OF CHICAGO, ASSIGNOR, BY MESNE ASSIGNMENTS, OF ONE-HALF TO W. H. DODGE AND L. E. DODGE, OF WAUKEGAN, ILLINOIS.

SPRING-SCALES.

SPECIFICATION forming part of Letters Patent No. 431,205, dated July 1, 1890.

Application filed May 21, 1889. Serial No. 311,522. (No model.)

*To all whom it may concern:*

Be it known that I, ESSINGTON N. GILFILLAN, a citizen of the United States, residing in the city of Chicago, county of Cook, and State of Illinois, have invented certain new and useful Improvements in Scales, of which the following is a specification.

This invention relates to improvements in scales, but more particularly to that class known as "spring-scales," in which the tension of a coil-spring is employed to determine the weight of the article, and has for its prime object to produce such a scale of novel and economical construction, and to have the indicating-scale adjustable in such manner that it may be readjusted with relation to the indicator (moved by the spring) whenever a variation in the length of the spring occurs, due to constant usage or any other cause. These objects are attained by the devices illustrated in the accompanying drawings, in which—

Figure 1:
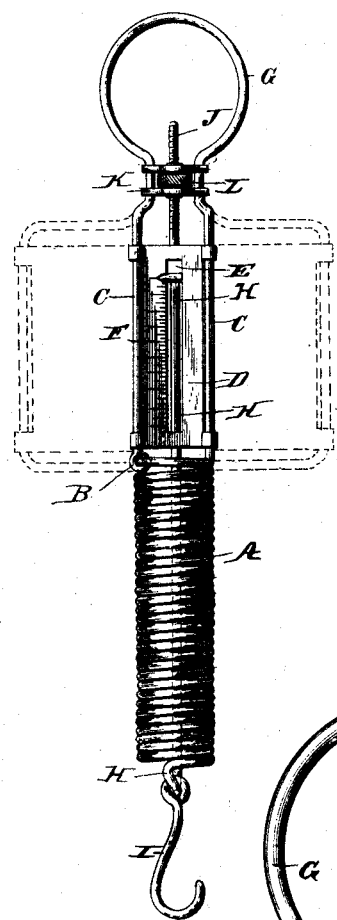
Figure 2:
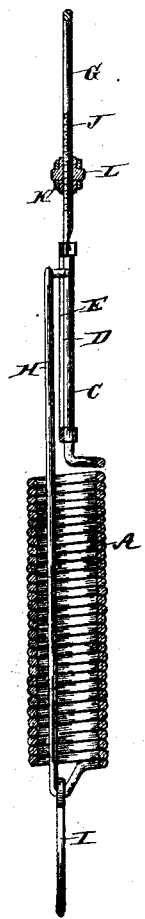
Figure 3:
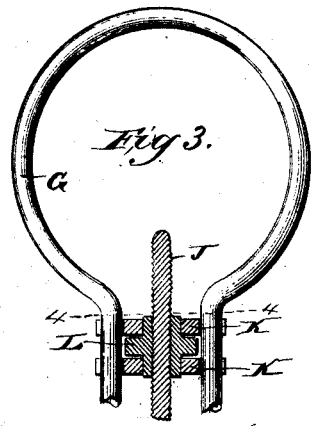
Figure 4:
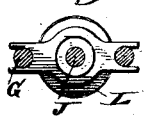

Figure 1 represents a side elevation of a scale embodying my invention; Fig. 2, a central vertical section thereof; Fig. 3, an enlarged detail vertical section through the handle of the scale, more clearly showing the means for adjusting the scale; Fig. 4, a horizontal section thereof on the line 4 4 of Fig. 3; Fig. 5, a side elevation of a scale embodying my invention, showing the same adapted for indicating upon a dial; Fig. 6, a central vertical section thereof, and Fig. 7 a detail rear elevation of the upper portion of the scale.

Similar letters of reference indicate the same parts in the several figures of the drawings.

Referring by letter to the accompanying drawings, A indicates a coil-spring, preferably composed of strong wire of any suitable length and strength, the upper terminal of which extends upwardly a suitable distance, and, after being bent into the desired form, is attached at B to the spring at the opposite side thereof. This extended portion forms a suitable frame C, immediately above the spring, with parallel sides of a distance apart substantially corresponding with the diameter of the spring, to which is attached, preferably, a thin metallic plate D, provided with a central longitudinal slot E, and having stamped, printed, or otherwise formed on one face thereof a scale F, as usual in such devices, indicating the number of pounds weight attached to the scale. Immediately above this scale-plate the frame is contracted by the inward bending of the wires, and again expanded into a loop or similar handle G, by means of which the scale may be held while weighing. The opposite lower terminal H of the spring is bent upwardly, lying in and extending up through the center of the spring above the same, where the extreme end thereof is bent at a right angle, so as to project forward through the slot E in the scale-plate, and thus constitute an indicator for the scale, this extended portion of course moving downwardly with the slightest expansion of the spring. In the bend of this extension is attached a hook I, by means of which the articles to be weighed are attached to the scale.

From the foregoing it will be seen that the spring, the indicator, and the frame of the scale supporting the scale-plate are all composed of a single piece of wire, and that the spring itself constitutes the only casing necessary, the frame being readily held in the hand during the weighing operation.

For the purpose of enabling the adjustment of the scale-plate to compensate for the variation in the position of the indicator due to the lengthening of the spring as a result of constant usage, or for any other cause, there may be attached to the upper end thereof a screw-threaded rod J, lying between the arms of the frame and passing through a pair of plates K, confined upon the contracted portion of the frame, between which plates loosely works a thumb-screw L upon said rod, by means of which, when rotated, the scale-plate may be caused to move vertically upon the frame, and thus be adjusted relatively to the indicator; but any other form of device for accomplishing this result may be employed without a material departure from the spirit of my invention, and, if desirable, this feature may be omitted entirely.

A scale made in accordance with my invention is obviously economical and durable, because the material employed is cheap and the construction so simple that the cost of manufacture will be reduced to the minimum. I therefore do not desire to limit myself to the exact form of the scale herein shown, for various modifications thereof might be made without a material departure from the spirit of my invention. For instance, if desired for advertising purposes, the frame C might be expanded, as shown by dotted lines in Fig. 1, so as to leave sufficient space at each side of the scale for the insertion of an advertisement; or the scale might be made foldable, and thereby adapted for use as a pocket-scale, by making a hinged joint between the frame and the spring, although such construction is not especially desirable by reason of the convenient form of the scale with the preferred construction.

It is also within the scope of my invention to adapt the scale for indicating the weight upon a dial, as well as upon a straight scale, which can be done without material alteration in the construction of the same, as illustrated in Figs. 5, 6, and 7 of the drawings. In this case the scale plate or dial D, instead of being rectangular, as in Fig. 1, is made circular, with the frame of the scale corresponding, in the center of which is pivoted upon an arbor M an indicating-hand N upon the front face of the dial and a crank-arm O upon the rear face thereof, to the free end of which latter is pivotally secured the upper end of the terminal H of the spring, so that whenever the spring is extended the arbor will be rotated and the indicating-hand caused to indicate upon a suitable scale P provided thereon, in the usual manner. In this case, as in the other, the spring constitutes the casing, and is formed, together with the indicating-plate, frame, and the handle of the scale, of a single continuous piece of wire, one terminal of the spring forming the frame and the other the indicator.

The contour of the frame in this, as in the preferred construction, may also be varied for advertising purposes, although the shape of the dial is such that ample room is provided for advertising purposes upon the face thereof.

Having described my invention, what I claim, and desire to secure by Letters Patent, is—

1. In a scale, the combination, with the frame and a scale-plate adjustably secured thereto, of a coil-spring attached to and suspended below said frame, the lower terminal of which spring is bent upwardly, lying within the coils thereof, and constitutes the indicator of the scale, substantially as described.

2. In a scale, the combination, with an adjustable scale-plate, of a frame supporting the same, a coil-spring below said frame, an indicator for said scale, and a handle, said handle and frame being formed by the bending of the upper terminal of said spring above the same, and the indicator by the bending of the lower terminal thereof, and a hook attached to said spring at the lower bend of the terminal thereof, substantially as described.

3. In a scale, the combination, with the frame and a coiled spring attached to and suspended below said frame, the lower terminal of which spring is bent upwardly, lying within the coil and constituting the indicator for the scale, of an adjustable scale-plate attached to said frame, a screw-threaded rod secured thereto, and a rotatable but otherwise immovable thumb-nut working upon said rod for adjusting the scale-plate, substantially as described.

ESSINGTON N. GILFILLAN.

Witnesses:
A. M. BENNETT,
W. R. OMOHUNDRO.